(12) United States Patent
Givoly

(10) Patent No.: US 9,191,476 B1
(45) Date of Patent: Nov. 17, 2015

(54) SYSTEM, METHOD, AND COMPUTER PROGRAM FOR SPEECH RECOGNITION ASSISTED CALL CENTER AND SELF SERVICE INTERFACE

(75) Inventor: Tal Givoly, Cupertino, CA (US)

(73) Assignee: Amdocs Software Systems Limited, Dublin (IE)

( * ) Notice: Subject to any disclaimer, the term of this patent is extended or adjusted under 35 U.S.C. 154(b) by 1770 days.

(21) Appl. No.: 12/350,880

(22) Filed: Jan. 8, 2009

(51) Int. Cl.
H04M 1/64 (2006.01)
H04M 1/27 (2006.01)
H04M 3/42 (2006.01)

(52) U.S. Cl.
CPC .................................. H04M 1/271 (2013.01)

(58) Field of Classification Search
CPC ........................ H04M 3/2281; H04M 3/5166
USPC ................. 379/265.01–266.01, 88.01–88.19; 455/414.1
See application file for complete search history.

(56) References Cited

U.S. PATENT DOCUMENTS

| | | | |
|---|---|---|---|
| 6,510,414 B1 | 1/2003 | Chaves | 704/270 |
| 6,973,426 B1* | 12/2005 | Schier et al. | 704/246 |
| 7,231,033 B2* | 6/2007 | Stuart et al. | 379/265.07 |
| 7,593,520 B1* | 9/2009 | Croak et al. | 379/202.01 |
| 7,907,705 B1* | 3/2011 | Huff et al. | 379/88.14 |
| 2002/0040297 A1* | 4/2002 | Tsiao et al. | 704/257 |
| 2003/0013438 A1 | 1/2003 | Darby | 455/419 |
| 2003/0142809 A1 | 7/2003 | Coffey | 379/265.01 |
| 2004/0008828 A1* | 1/2004 | Coles et al. | 379/88.01 |
| 2004/0264652 A1 | 12/2004 | Erhart et al. | |
| 2005/0105712 A1 | 5/2005 | Williams et al. | |
| 2006/0020447 A1* | 1/2006 | Cousineau et al. | 704/9 |
| 2006/0020459 A1* | 1/2006 | Carter et al. | 704/246 |
| 2007/0060136 A1* | 3/2007 | Ramer et al. | 455/445 |
| 2007/0079239 A1 | 4/2007 | Ghassabian | 715/707 |
| 2007/0127439 A1* | 6/2007 | Stein | 370/352 |
| 2007/0130337 A1* | 6/2007 | Arnison | 709/225 |
| 2007/0263839 A1* | 11/2007 | Gandhi et al. | 379/265.02 |
| 2008/0189099 A1 | 8/2008 | Friedman et al. | 704/8 |
| 2008/0195659 A1* | 8/2008 | Rawle | 707/104.1 |
| 2011/0183645 A1* | 7/2011 | Chawla | 455/410 |

* cited by examiner

Primary Examiner — Solomon Bezuayehu
(74) Attorney, Agent, or Firm — Zilka-Kotab PC

(57) ABSTRACT

A system, method, and computer program are provided for using speech recognition to assist call center interactions with a caller. In operation, utterances are received between a caller and an agent. Additionally, speech recognition is performed on the utterances utilizing a context of the utterances. Furthermore, an interaction with the caller is assisted utilizing the speech recognition.

22 Claims, 5 Drawing Sheets

SYSTEM, METHOD, AND COMPUTER PROGRAM FOR SPEECH RECOGNITION ASSISTED CALL CENTER AND SELF SERVICE INTERFACE

FIELD OF THE INVENTION

The present invention relates to speech recognition, and more particularly to using speech recognition to assist call center interactions with callers.

BACKGROUND

Customer interaction is an important aspect for every business providing a product or a service. Developing and maintaining efficient mechanisms for customer interaction is desirable. For example, it is desirable to implement efficient and reliable mechanisms for customer interactions involving phone communications, as these communications make up a large number of interactions with customers. There is thus a need for addressing these and/or other issues.

SUMMARY

A system, method, and computer program are provided for using speech recognition to assist call center interactions with a caller. In operation, utterances are received between a caller and an agent. Additionally, speech recognition is performed on the utterances utilizing a context of the utterances. Furthermore, an interaction with the caller is assisted utilizing the speech recognition.

DETAILED DESCRIPTION

Figure 1:
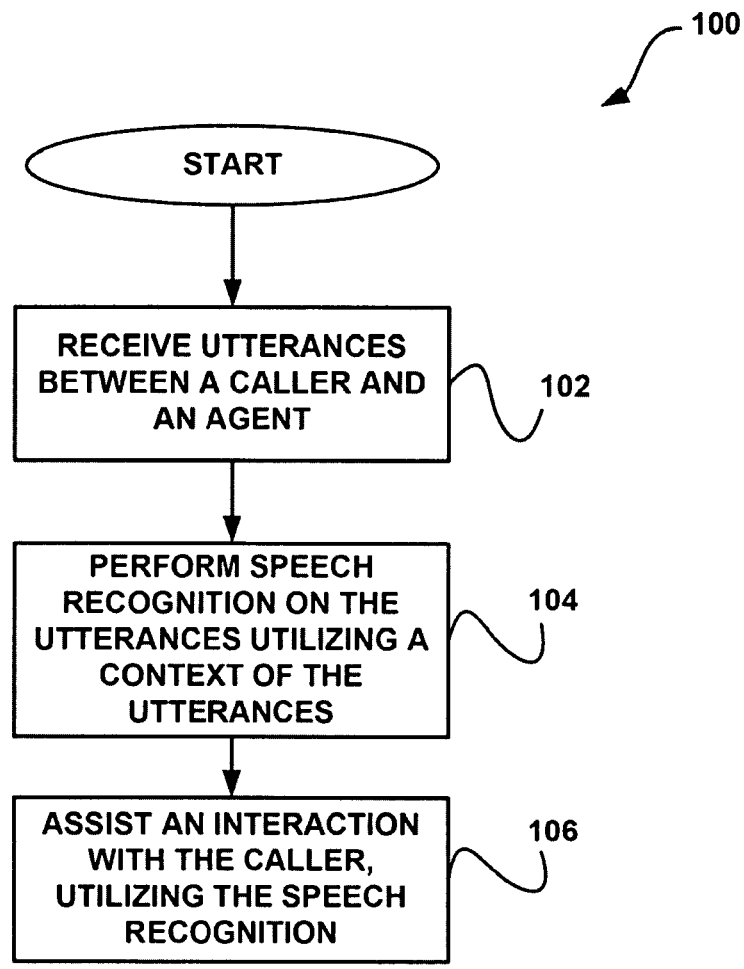
FIG. 1 shows a method for using speech recognition to assist call center interactions with a caller, in accordance with one embodiment.

FIG. 1 shows a method 100 for using speech recognition to assist call center interactions with a caller, in accordance with one embodiment. As shown, utterances are received between a caller and an agent. See operation 102.

In the context of the present description, an utterance refers to any vocal expression. For example, in various embodiments, the utterance may include one or more words, phrases, or portions of a dialogue. Furthermore, a caller refers to any person capable of providing the utterances.

Additionally, in the context of the present description, an agent refers to any entity capable of receiving or communicating an utterance. For example, in one embodiment, the agent may include a human agent. In another embodiment, the agent may include a software agent. In still another embodiment, the agent may include a call center agent (e.g. a customer service representative, etc.).

It should be noted that, in one embodiment, the utterances from the caller may be received utilizing a channel separate than a channel used for receiving the utterances of the agent. For example, the utterances may be received and analyzed separately. In another embodiment, the utterances may be received using the same channel and the utterances from the caller may be separated from the utterances from the agent.

Once the utterances are received, speech recognition is performed on the utterances, utilizing a context of the utterances. See operation 104. In the context of the present description, speech recognition refers to any technique of converting utterances into a recognizable format (e.g. a machine-readable format, a human readable format, etc.). In one embodiment, the speech recognition may include converting the utterances to text.

In one embodiment, the speech recognition may include parsing the utterances. In this case, the caller may utter a series of sentences and the speech recognition may parse the speech and obtain any relevant utterance. In another embodiment, the speech recognition may further include identifying and/or recognizing the context or semantics of the utterances.

The context of the utterances may include any aspect of the utterances that put the utterances in context. For example, the context may include at least one semantic aspect. Additionally, the context may include a denotation of the utterances or a portion of the utterances, a connotation of the utterances or a portion of the utterances, grammar associated with the utterances or a portion of the utterances, definitions of the utterances or a portion of the utterances, a pattern of the utterances, and/or any other semantics or aspect of the context.

Once the speech is recognized, an interaction with the caller is assisted utilizing the speech recognition. See operation 106. In one embodiment, the assisting may include filling out fields of a database with text generated from the speech. For example, the recognized speech may include at least one of a name, date of birth, and a telephone number, etc. Thus, this speech may be converted to text and fields in the database may be filled with this information.

In one embodiment, fields of a form may also be filled with the text. In this case, the form may include a template with a plurality of fields. As an option, the form and the text may be stored in the database. As another option, the assisting may include filling in fields of a user interface.

In another embodiment, the assisting may include directing a flow of the utterances between the caller and the agent. For example, it may be determined that a question is to be asked based on the identified context or semantics. In this case, the user may be asked a question that flows logically from a previous answer from which the semantics were identified.

In yet another embodiment, the assisting may include prompting an action of the agent. For example, the agent may be prompted to provide a remedy (e.g. fixing a technical issue, a billing issue, user contact information, etc.). As another example, the assisting may include prompting a user for additional information. Further, the assisting may include the agent solving a problem of the caller based on a policy of an organization (e.g. an organization associated with the agent, etc.).

More illustrative information will now be set forth regarding various optional architectures and uses in which the foregoing method may or may not be implemented, per the desires of the user. It should be strongly noted that the following information is set forth for illustrative purposes and should not be construed as limiting in any manner. Any of the following features may be optionally incorporated with or without the exclusion of other features described.

Figure 2:
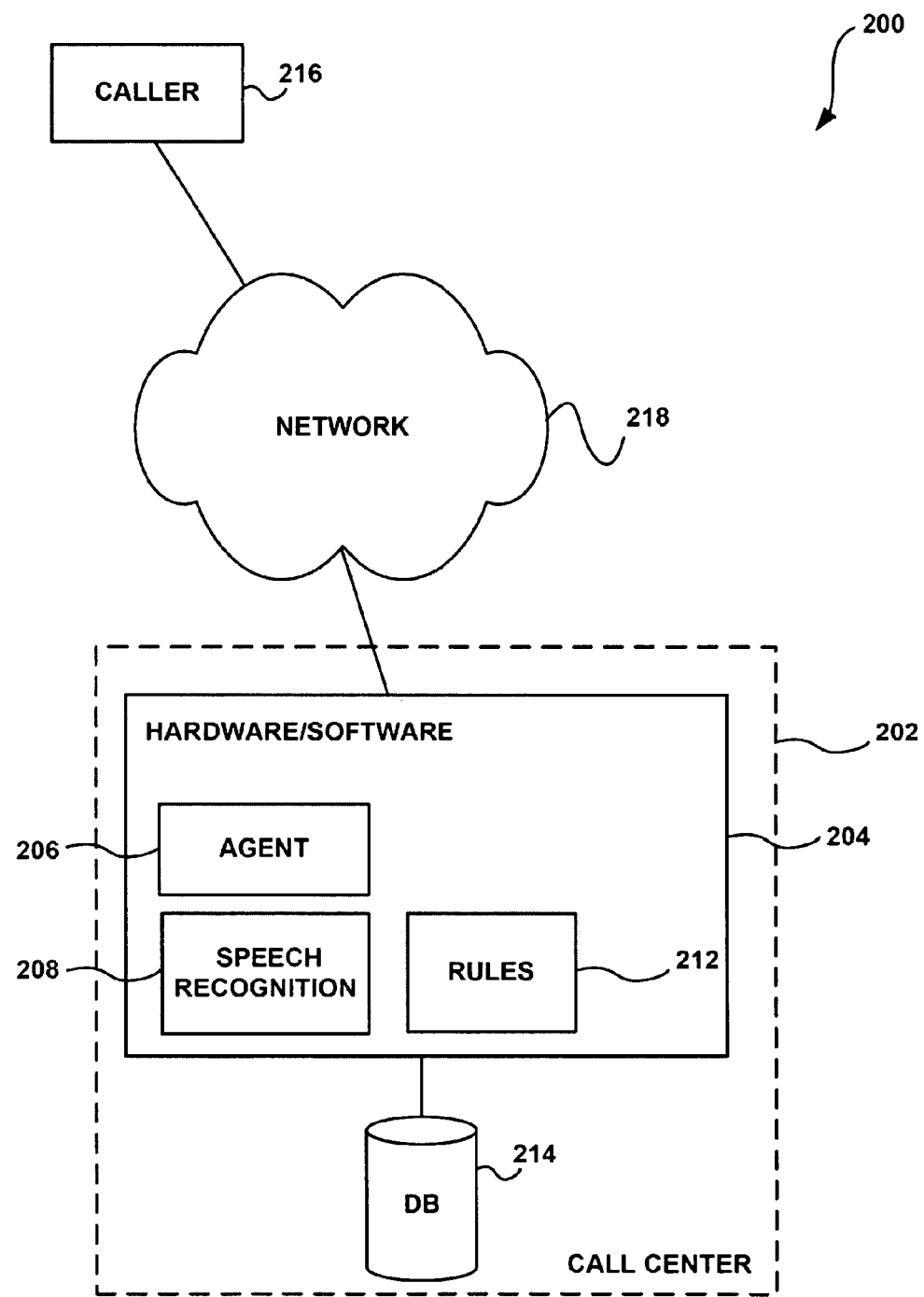
FIG. 2 shows a system for using speech recognition to assist call center interactions with a caller, in accordance with one embodiment.

FIG. 2 shows a system 200 for using speech recognition to assist call center interactions with a caller, in accordance with one embodiment. As an option, the system 200 may be implemented in the context of the details of FIG. 1. Of course, however, the system 200 may be implemented in any desired environment. It should also be noted that the aforementioned definitions may apply during the present description.

As shown, a call center 202 is provided including a hardware/software platform 204. In various embodiments, the hardware/software platform 204 may take the form of various devices including a desktop computer, a lap-top computer, a mobile phone device, and/or any other type of logic or device. Moreover, the hardware/software platform 204 may include any hardware and/or software capable of implementing speech recognition and any associated functionality. For example, in one embodiment, the hardware/software platform 204 may include an interface for receiving an utterance, logic, a processor for executing the logic, and memory.

As shown further, the hardware/software platform 204 may include a software agent 206. In this case, the software agent 206 may include any software capable of receiving a plurality of utterances. This software agent may operate in conjunction with a hardware interface for receiving the utterances, for example.

Additionally, a speech recognition module 208 is provided. In this case, the speech recognition module 208 may include any computer software capable of performing speech recognition. Furthermore, the hardware/software platform 204 may include a set of rules 212 for prompting a caller for utterances. For example, the prompting may be performed as a function of the plurality of rules 212. The call center 202 may also include a database 214 for storing data output from a speech recognition process implemented by the speech recognition module 208 and an associated processer.

In operation, a caller 216 may communicate with the call center 202 over a network 218. The call center 202 may include any center capable of receiving calls. For example, in various embodiments, the call center 202 may include a customer service call center, a product provider call center, a service provider call center, or any other call center.

Further, in various embodiments, the network 216 may take any form including, but not limited to, a telecommunications network, a local area network (LAN), a wireless network, a wide area network (WAN) such as the Internet, peer-to-peer network, cable network, etc. Additionally, the caller 216 may communicate with the call center 202 utilizing any device capable of communicating an utterance. For example, in various embodiments, the caller 216 may utilize a phone, a desktop computer, a lap-top computer, a personal digital assistant (PDA) device, a mobile phone device, and/or any other type of device capable of communicating an utterance.

It should be noted that, the software agent 206 may be capable of receiving and/or communicating vocal utterances and audibly prompting the caller 216 for utterances. The prompting may be initiated based on the set of rules 212. Although, the software agent 206 may be capable of receiving the utterances and prompting the caller 216 for the utterances, a human agent may also be in communication with the caller 216. In this case, the human agent may prompt the caller 216 for utterances (e.g. by asking a question, etc.) and the software agent 206 may receive the utterances in the background.

Thus, phrases from a conversation between the caller 216 and the human agent and/or the software agent 206 may be received, parsed, and processed such that the semantics or a context of the utterances are known. Furthermore, the technology for implementing such functionality may be integrated in the call center 202 or in an interactive voice response (IVR) center. In this way, the hardware/software platform 204 of the call center 202 may automatically parse and recognize any details provided by the caller 216 and fill in the relevant details in the database 214.

This allows a rule-based processing of the call. For example, as more details become known due to the fact that the details are spontaneously revealed by the caller 216 (e.g. a subscriber, a potential customer, etc.) the rules 212 may be utilized to determine how to next prompt the caller 216 for information. Thus, irrespective of whether the caller 216 initiates the communication or whether the communication is initiated from the call center 202, any relevant details included in the utterances of the caller 216 may be entered into the database 214. This may occur regardless of whether the caller 216 is a customer.

For example, the caller 216 may state a name, a telephone number, a date of birth, any other identifying information, and detailed reasons for calling, etc. Any of this information may be recognized by the speech recognition module 208 and be automatically entered in the relevant fields of a form and/or the database 214. In one embodiment, the entered information may include an indicator denoting that this information was detected by the speech recognition module 208.

As an option, additional processing and/or verification may be performed on the information indicated to be detected by the speech recognition module 208. This additional processing and/or verification may be implemented to ensure the accuracy of the information, for example.

In the case that the software agent 206 is utilized to prompt the caller 216, the rules 214 may guide the flow of the conversation based on the information known up to that point. In this manner, the caller 216 may utter a plurality of sentences to the point of "rambling," and the call center 202 may determine how to respond to the caller 216.

As an example, utterances from the caller 216 may be analyzed such that keywords are understood in the given context. In this case, the grammar used in the utterances, the pattern of the words spoken, and the definitions of the key words may all be used to understand what is meant by the utterances. In this way, the call center 202 may be used to understand the conversation and anticipate utterances between the caller 216 and the agent 206.

For instance, the utterance of the caller 216 may include an address. The call center 202 may recognize that the utterance is an address by a pattern and grammar of the utterance. The agent 206 may then take an action based on this recognition, such as filling in an address field of a form, user interface, or database. As another option, the agent 206 may direct a flow of conversation, based on this recognition.

Similarly, the utterance of the caller 216 may include a phone number. The call center 202 may recognize that the utterance is a phone number by a pattern and grammar of the utterance. The agent 206 may then take an action based on this recognition, such as filling in a phone number field of a form, user interface, or database. As another option, the agent 206 may direct a flow of conversation, based on this recognition.

Thus, a pattern of the utterances may be recognized and the meaning of the utterances may be determined. This may be implemented to distinguish between the same or similar key words that are used in a different context. For example, the caller 216 may say "I have a problem with my email." The context of this utterance may be determined utilizing the pattern of words. In this case, any combination of words indicating that the caller 216 has a problem may be recognized based on grammar, etc. Once it is determined that the caller 216 has a problem, the additional keyword, "email," may be recognized as the item to which the problem is occurring.

On the other hand, the caller 216 may say "My email address is . . . " The context of this utterance may also be determined utilizing the pattern of words. In this case, any combination of words indicating that the caller 216 is communicating an email address may be recognized based on grammar, etc. Once it is determined that the caller 216 is communicating the email address, the email address may be extracted and used to fill in an email address field or to authenticate the caller 216, etc.

In another case, the caller 216 may call the call center 202 about a problem and the agent 206 may prompt the caller 216 for authentication information. Instead of providing authentication information, however, the caller 216 may blurt out a problem and/or other information, such as address or location information. The problem and the location information may be recognized utilizing semantics of the utterance.

If the agent 206 or the call center 202 are able to provide a solution or insight to the problem based on the information provided, without authenticating the caller 216, the solution may be provided to the caller 216. On the other hand, if the agent 206 or the call center 202 are not able to provide a solution or insight to the problem based on the information provided, the caller 216 may be prompted for more information different from the information already provided.

In one embodiment, the speech recognized utilizing the speech recognition may be used to assist the agent 206 by verifying actions of the agent 206. As an option, the assisting may include verifying that text entered by the agent 206 corresponds to the speech. For example, the utterance from the caller 216 may include a credit card number. A human agent may enter the number into the database 214 by typing the number using a keypad. The speech recognized when the caller 216 uttered the credit card number may be used to verify that the number being typed in is correct.

As an option, the number may be displayed on a screen such that the human agent may read the number for verification. As another option, the key strokes of the human agent may be verified automatically by comparing the keystrokes to text generated as a result of the speech recognition. In this case, the human agent may be alerted if the text entered by the agent does not correspond to the speech. The human agent may be alerted by a pop-up alert, an audible alert, and/or any other type of alert.

Figure 3:
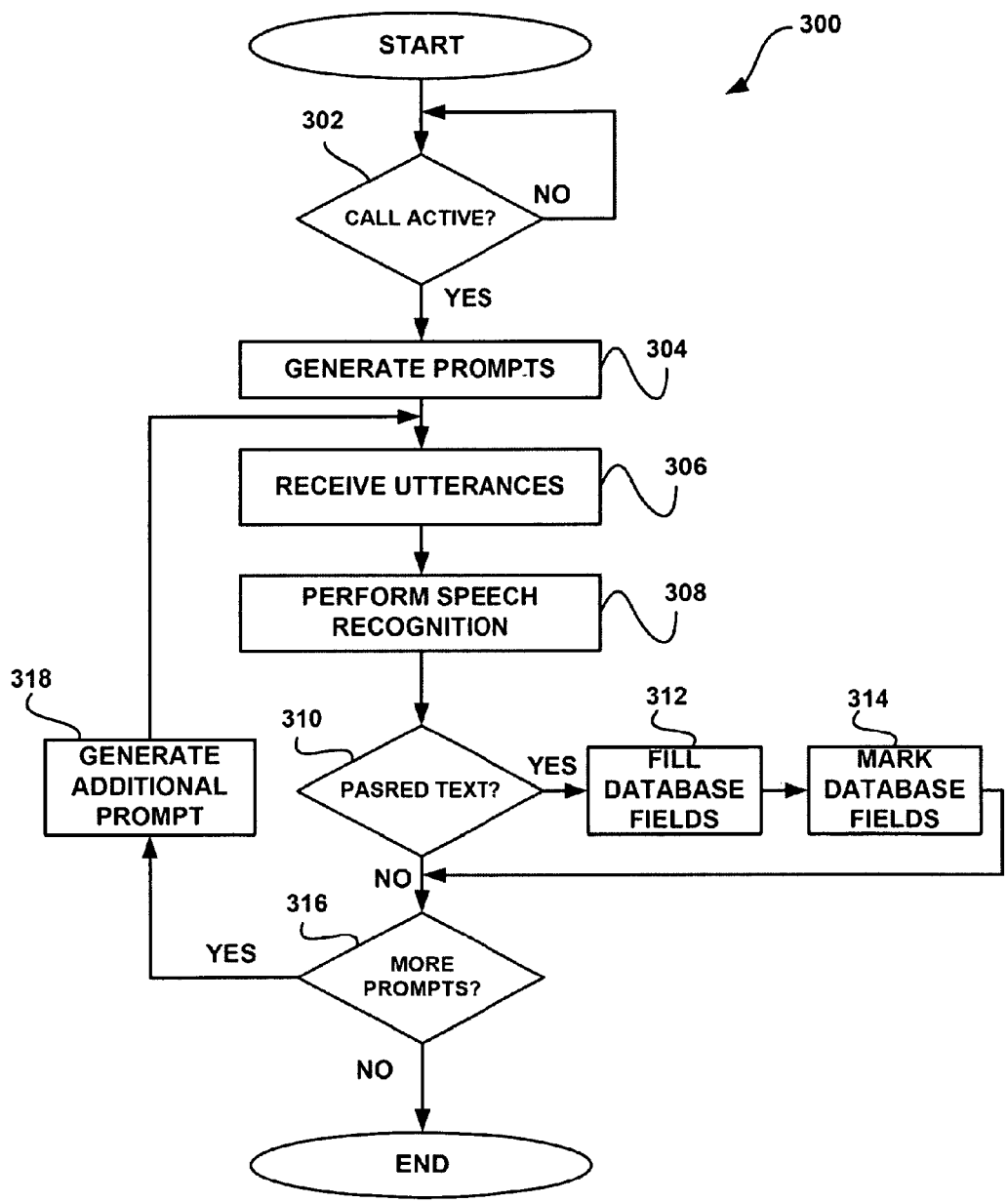
FIG. 3 shows a method for using speech recognition to assist call center interactions with a caller, in accordance with another embodiment.

FIG. 3 shows a method 300 for using speech recognition to assist call center interactions with a caller, in accordance with another embodiment. As an option, the method 300 may be implemented in the context of the details of FIGS. 1-2. Of course, however, the method 300 may be carried out in any desired environment. Further, the aforementioned definitions may equally apply to the description below.

As shown, it is determined whether there is an active call. See operation 302. In this case, an active call refers to any vocal communication channel being open between a caller and an agent.

If it is determined that there is an active call, prompts are generated. See operation 304. The prompts may include any prompt capable of initiating an utterance. For example, in various embodiments, the prompt may include a prompt for a name, location, telephone number, address, general information, and/or any other information. In these cases, the prompt may include an automated audible prompt or a prompt by a human agent.

In one embodiment, computer code may be provided for prompting the caller for the utterances. Additionally, the prompting may be performed as a function of a plurality of rules. In this case, the rules may consider responses to previous utterances.

Once the prompts are generated, utterances are received. See operation 306. The utterances may be provided by the caller in response to the prompts.

For example, the caller may be prompted with a question and the caller may respond with a plurality of utterances. The utterances may be in a free-form such that relevant information and irrelevant information are provided by the caller. Furthermore, these utterances may be directed towards a human agent or an automated software agent.

Once the utterances are received, speech recognition is performed on the utterances. See operation 308. As an option, the speech recognition may convert the received utterances to text. Additionally, the speech recognition may convert the received utterances to text and to a machine readable format.

Furthermore, the speech recognition may include parsing the text. For example, the speech recognition may receive utterances representative of phrases. The utterances representative of phrases may then be parsed to identify parsed text within the phrases, such that fields of a database are filled with the parsed text. In this case, the parsed text may be representative of only a subset of the utterances.

In some cases, the utterances may not include any relevant information to be parsed. Furthermore, portions of the utterances outside of a specific context may be deemed irrelevant. For example, in one embodiment, only information associated with parameters of a caller interface or a call center interface may be deemed relevant and thus be recognizable. All other information not relating to these parameters may be irrelevant and thus may not be recognized using the speech recognition.

In one embodiment, any field displayed on a caller interface, a call center interface, or imbedded in tabs, wizard pages, etc. may be deemed relevant. Accordingly, the context of utterances corresponding to information about these fields may be evaluated.

As shown further in FIG. 3, it is determined whether there is parsed text as a result of the speech recognition. See operation 310. If it is determined that there is parsed text as a result of the speech recognition, fields of a database are filled with the text. See operation 312. In this case, the fields may include any field associated with personal information (e.g. name, address, phone number, etc.), subscription information (e.g. subscription status, etc.), billing information, and/or any other information.

In addition to filling the database fields, the database fields may be marked. See operation 314. In this case, computer code may be provided for marking at least one of the text and the fields filled with the text, in response to the speech recognition. Additionally, computer code may be provided for prompting verification of the text, based on the marking.

As shown further in FIG. 3, it is determined whether to generate more prompts. See operation 316. As an option, the determination may be based on a previous response of the caller and/or the parsed text.

For example, the computer code may be utilized for prompting the caller for the utterances. In this case, the prompting may be performed as a function of a plurality of rules, where the plurality of rules take in account the text. Thus, if the text does not include expected information for filling in the database fields, the rules may determine that the caller is to be re-prompted for this information.

Furthermore, if the text includes information to be utilized in filling in the fields in the database, the rules may determine that the caller is to be prompted for additional information. As an option, the rules may be dynamic such that every prompt is dependent upon a previous caller response. If it is determined that more prompts are to be generated, additional prompts are generated. See operation 318.

In one embodiment, the speech recognition may also identify at least one semantic aspect associated with the utterances. In this case, the speech recognition may be utilized to identify a meaning of one or more phrases.

For example, a caller may be prompted with a statement: "Caller, please provide your name." In response, the caller may state: "Thank you for the request. My name is Caller One, although my friends call me C1." In this case, the speech recognition may be utilized to parse and obtain the name "Caller One" only, by parsing the utterances and identifying a meaning of the utterances. In this way, performing speech recognition on the utterances to generate text and filling in fields of the database with the text may be carried out as a function of the semantic aspect.

Additionally, in one embodiment, the caller may be identified based on the text. For example, the caller may be identified utilizing information obtained as part of the speech recognition (e.g. name information, address information, subscription information, etc.). Based on the identification of the caller, the fields in the database to be filled may be selected.

Thus, utterances may be received from an unknown caller and speech recognition may be performed on the utterances to generate text. The text may include a name, date of birth, and a telephone number, etc. This text may then be utilized to identify the caller such that an appropriate forms and/or database fields may be selected and filled with the text.

Figure 4:
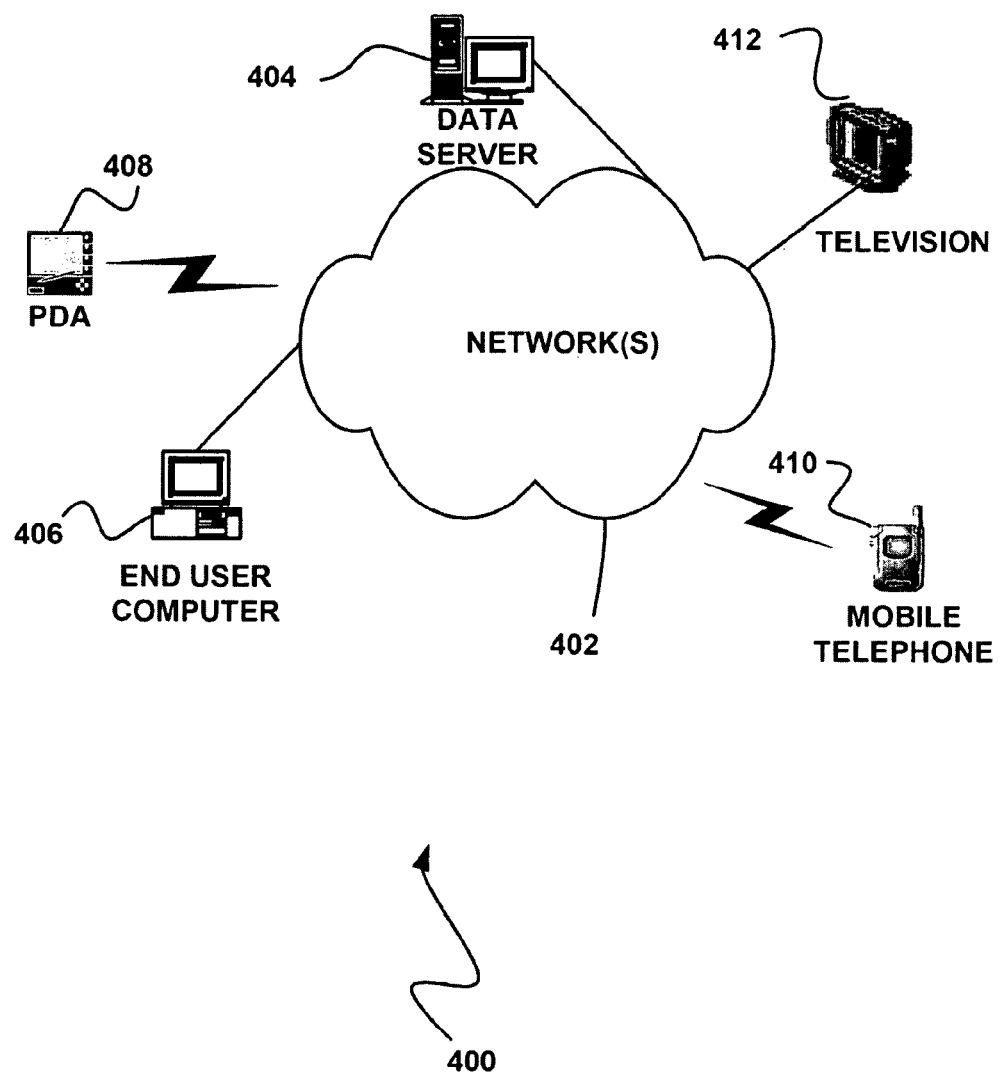
FIG. 4 illustrates a network architecture, in accordance with one embodiment.

FIG. 4 illustrates a network architecture 400 in which the various architecture and/or functionality of the various previous embodiments may be implemented. As shown, at least one network 402 is provided. In the context of the present network architecture 400, the network 402 may take any form including, but not limited to a telecommunications network, a local area network, a wireless network, a wide area network such as the Internet, peer-to-peer network, cable network, etc. While only one network is shown, it should be understood that two or more similar or different networks 402 may be provided.

Coupled to the network 402 is a plurality of devices. For example, a server computer 404 and an end user computer 406 may be coupled to the network 402 for communication purposes. Such end user computer 406 may include a desktop computer, lap-top computer, and/or any other type of logic. Still yet, various other devices may be coupled to the network 402 including a personal digital assistant (PDA) device 408, a mobile phone device 410, a television 412, etc.

Figure 5:
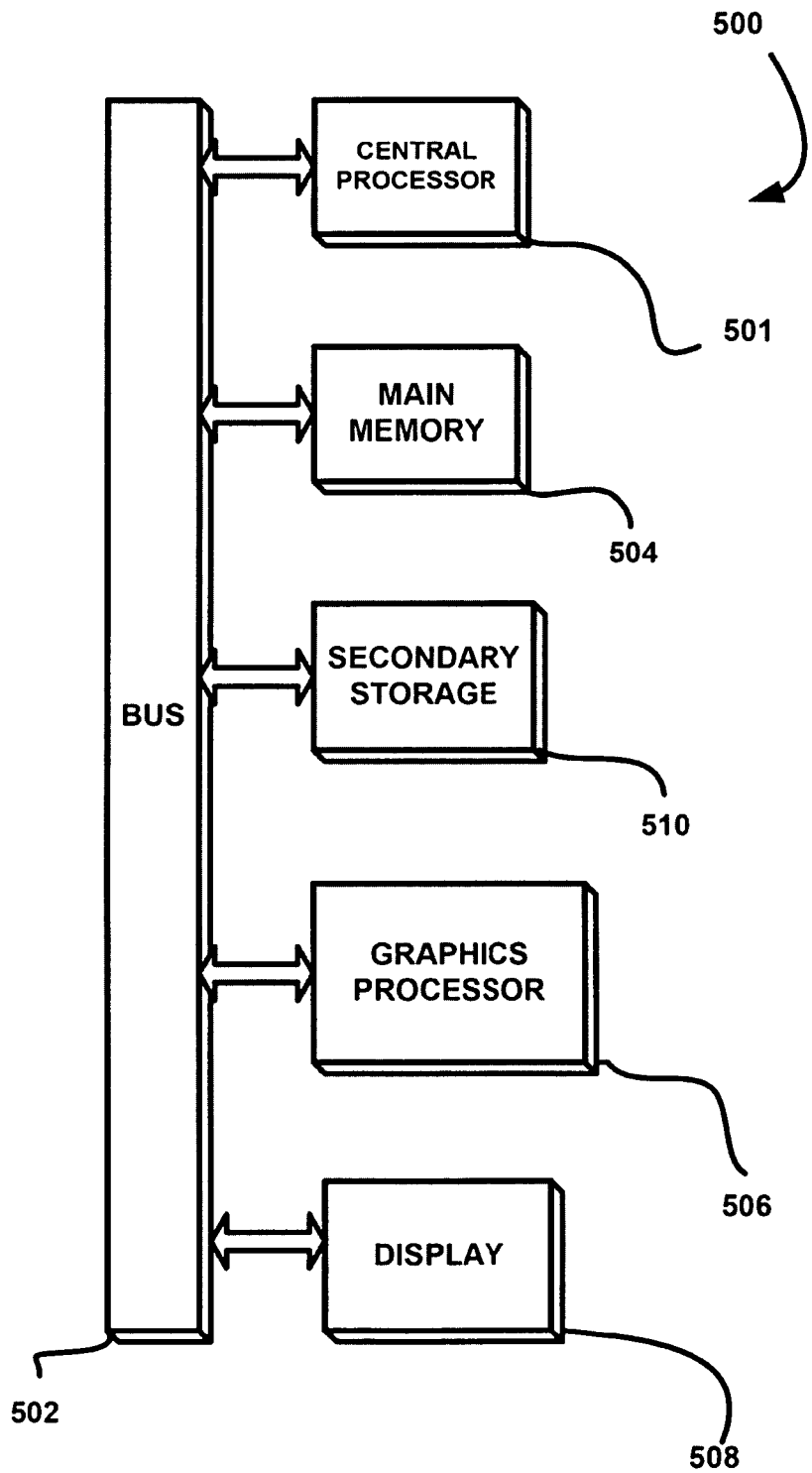
FIG. 5 illustrates an exemplary system, in accordance with one embodiment.

FIG. 5 illustrates an exemplary system 500 in which the various architecture and/or functionality of the various previous embodiments may be implemented. As shown, a system 500 is provided including at least one host processor 501 which is connected to a communication bus 502. The system 500 also includes a main memory 504. Control logic (software) and data are stored in the main memory 504 which may take the form of random access memory (RAM).

The system 500 also includes a graphics processor 506 and a display 508, i.e. a computer monitor. In one embodiment, the graphics processor 506 may include a plurality of shader modules, a rasterization module, etc. Each of the foregoing modules may even be situated on a single semiconductor platform to form a graphics processing unit (GPU).

In the present description, a single semiconductor platform may refer to a sole unitary semiconductor-based integrated circuit or chip. It should be noted that the term single semiconductor platform may also refer to multi-chip modules with increased connectivity which simulate on-chip operation, and make substantial improvements over utilizing a conventional central processing unit (CPU) and bus implementation. Of course, the various modules may also be situated separately or in various combinations of semiconductor platforms per the desires of the user.

The system 500 may also include a secondary storage 510. The secondary storage 510 includes, for example, a hard disk drive and/or a removable storage drive, representing a floppy disk drive, a magnetic tape drive, a compact disk drive, etc. The removable storage drive reads from and/or writes to a removable storage unit in a well known manner.

Computer programs, or computer control logic algorithms, may be stored in the main memory 504 and/or the secondary storage 510. Such computer programs, when executed, enable the system 500 to perform various functions. Memory 504, storage 510 and/or any other storage are possible examples of computer-readable media.

In one embodiment, the architecture and/or functionality of the various previous figures may be implemented in the context of the host processor 501, graphics processor 506, an integrated circuit (not shown) that is capable of at least a portion of the capabilities of both the host processor 501 and the graphics processor 506, a chipset (i.e. a group of integrated circuits designed to work and sold as a unit for performing related functions, etc.), and/or any other integrated circuit for that matter.

Still yet, the architecture and/or functionality of the various previous figures may be implemented in the context of a general computer system, a circuit board system, a game console system dedicated for entertainment purposes, an application-specific system, and/or any other desired system. For example, the system 500 may take the form of a desktop computer, lap-top computer, and/or any other type of logic. Still yet, the system 500 may take the form of various other devices including, but not limited to, a personal digital assistant (PDA) device, a mobile phone device, a television, etc.

Further, while not shown, the system 500 may be coupled to a network (e.g. a telecommunications network, local area network, wireless network, wide area network such as the Internet, peer-to-peer network, cable network, etc.) for communication purposes.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:
1. A method, comprising:
sending, via an interface, from an agent to a caller, a request for authentication information for the caller;
receiving, in response to the request for authentication information, a plurality of utterances from the caller, the plurality of utterances including a plurality of spoken words;
performing, by at least one processor, speech recognition on the plurality of spoken words to generate text representing the utterances;
identifying, by the at least one processor, a context of the utterances, using the text, wherein the context including a particular pattern of the utterances and a particular grammar used in the utterances;

determining, by the at least one processor, a problem and location information associated with the caller using the identified context;

in response to determining that the caller has not provided expected authentication information in the identified context, determining, by at least one processor, whether a solution to the problem is available based on the location information;

when it is determined that the solution to the problem is available, providing, by the at least one processor, the solution to the caller, via the interface, without authenticating the caller;

when it is determined that the solution to the problem is not available, requesting, via the interface, additional authentication information from the caller; and verifying, by the at least processor, text entered by the agent matches the recognized spoken words; and in response to detecting a mismatch, alerting the agent, via agent interface, that the mismatch has been detected.

2. The method of claim 1, wherein the utterances include phrases.

3. The method of claim 2, wherein the phrases are parsed to identify parsed text within the phrases, such that fields of a database are filled with the parsed text.

4. The method of claim 3, wherein the parsed text is representative of only a subset of the utterances.

5. The method of claim 1, wherein the context includes at least one semantic aspect associated with the utterances.

6. The method of claim 5, wherein the performing is carried out as a function of the semantic aspect.

7. The method of claim 1, wherein the speech recognition includes converting the utterances to the text and the text is marked in response to the conversion.

8. The method of claim 7, and further comprising prompting verification of the text, based on the marking.

9. The method of claim 1, and further comprising identifying the caller, based on the speech recognition.

10. The method of claim 9, and further comprising selecting fields to be filled, based on the identification of the caller.

11. The method of claim 1, wherein speech recognized from the speech recognition includes at least one of a name, date of birth, and a telephone number.

12. The method of claim 1, wherein the agent includes a human agent.

13. The method of claim 1, wherein the agent includes a software agent.

14. The method of claim 1, wherein the agent includes a call center agent.

15. The method of claim 1, further comprising filling in fields of a database with text generated as a result of the speech recognition.

16. The method of claim 1, further comprising directing a flow of the utterances between the caller and the agent.

17. The method of claim 1, further comprising prompting an action of the agent.

18. The method of claim 1, wherein the context includes grammar.

19. The method of claim 1, wherein the context includes definitions.

20. A non-transitory computer readable medium embodied on computer program product, comprising computer code when executed by at least one processor to:

sending, via an interface, from an agent to a caller, a request for authentication information for the caller;

receiving, in response to the request for authentication information, a plurality of utterances from the caller, the plurality of utterances including a plurality of spoken words;

performing, by the at least one processor, speech recognition on the plurality of spoken words to generate text representing the utterances;

identifying, by the at least one processor, a context of the utterances, using the text, wherein the context including a particular pattern of the utterances and a particular grammar used in the utterances;

determining, by the at least one processor, a problem and location information associated with the caller using the identified context;

in response to determining that the caller has not provided expected authentication information in the identified context, determining, by at least one processor, whether a solution to the problem is available based on the location information;

when it is determined that the solution to the problem is available, providing, by the at least one processor, the solution to the caller, via the interface, without authenticating the caller;

when it is determined that the solution to the problem is not available, requesting, via the interface, additional authentication information from the caller; and verifying, by the at least processor, text entered by the agent matches the recognized spoken words; and in response to detecting a mismatch, alerting the agent, via agent interface, that the mismatch has been detected.

21. A system, comprising:

an interface, to send a request for authentication information from an agent to a caller; and receive, in response to the request for authentication information, a plurality of utterances from the caller, wherein the plurality of utterances including a plurality of spoken words;

at least one processor, to perform a speech recognition on the plurality of spoken words to generate text representing the utterances;

the at least one processor, to identify a context of the utterances, using the text, wherein the context including a particular pattern of the utterances and a particular grammar used in the utterances;

the at least one processor, to determine a problem and location information associated with the caller using the identified text;

the at least one processor, in response to determining that the caller has not provided expected authentication information, determining whether a solution to the problem is available based on the location information;

when it is determined that the solution to the problem is available, provide, by at least the one processor, the solution to the caller, via the interface, without authenticating the caller; and when it is determined that the solution to the problem is not available, request, via the interface, additional information from the caller;

verifying, by the at least processor, text entered by the agent matches the recognized spoken words; and in response to detecting a mismatch, alerting the agent, via agent interface, that the mismatch has been detected.

22. The method of claim 1, wherein the context is used to recognize the meaning of the portion of the utterances for distinguishing between a set of keywords included in the text having multiple different meanings depending on a context in which the set of keywords is used.

* * * * *